United States Patent [19]

Dizikes

[11] Patent Number: 4,770,951
[45] Date of Patent: Sep. 13, 1988

[54] MAGNETIC FLEXIBLE DISKS
[75] Inventor: Louis J. Dizikes, Bedford, Tex.
[73] Assignee: Graham Magnetics, Inc., North Richland Hills, Tex.
[21] Appl. No.: 766,251
[22] Filed: Aug. 16, 1985
[51] Int. Cl.$^4$ ............................................. G11B 5/70
[52] U.S. Cl. .................................. 428/694; 427/128; 427/130; 427/131; 428/900
[58] Field of Search .............. 428/694, 900; 427/131, 427/130, 128; 360/135; 29/90 R; 252/62, 56

[56] References Cited
U.S. PATENT DOCUMENTS

| | | | |
|---|---|---|---|
| 3,897,354 | 7/1975 | Woditsch | 252/62.56 |
| 4,276,183 | 6/1981 | Wilson | 428/694 |
| 4,297,395 | 10/1981 | Buxbaum et al. | 252/62.56 |
| 4,430,782 | 2/1984 | Bornhorst et al. | 29/90 R |
| 4,448,846 | 5/1984 | Chang et al. | 428/694 |
| 4,514,452 | 4/1985 | Tanaka et al. | 427/131 |
| 4,595,631 | 6/1986 | Matsumoto | 428/694 |

Primary Examiner—Paul J. Thibodeau
Attorney, Agent, or Firm—Andrew F. Kehoe

[57] ABSTRACT

An improved flexible magnetic recording medium of the flexible disk type characterized by the use of effective quantities of magnetite to enhance the recording mediums, physical properties, conductivity and opacity. Superior magnetic recording performance is exhibited by such disks.

5 Claims, No Drawings

MAGNETIC FLEXIBLE DISKS

BACKGROUND OF THE INVENTION

This invention relates to improved magnetic coating media for flexible (floppy) disk products of the type used in magnetic recording, particularly digital recording.

Some of the problems faced by manufacturers of flexible disks used in magnetic recording are: (1) to provide a coating which is opaque to the light, usually infrared signal, which is transmitted selectively through apertures in the disk and used as a control means when the disk is in use on a disk drive, (2) to provide a level of conductivity in the disk's coating for the elimination of static charge, and (3) to provide a tough, abrasion and wear resistant coating. It has been customary to use a substantial quantity of carbon black to achieve such opacity and conductivity characteristics.

However, use of carbon black in the coating to achieve the desired opacity and conductivity had certain undesirable features. Carbon black has a very high binder demand. High levels of carbon black will tend to weaken and soften the coating. In some binder systems, this creates a need for another non-magnetic filler as an abrasive additive to toughen the coating surface and act as a head cleaning agent when the disk is operating in the drive. Also, use of carbon black and other non-magnetic additives limits the level of magnetic pigment which may be used in the coating.

Initially, Applicant directed his efforts to finding a means to improve the recording performance of the flexible disk coatings by reducing the coating thickness required and thus increasing the resolution of the recording signal. By decreasing the thickness of the coating and bringing the recording head closer to that portion of the magnetic media coating which is closest to the substrate on which the media is carried, the high frequency (2F) signal can be increased and the low frequency (1F) signal is directly decreased. However, as will be disclosed below, his investigation led to substantial and unforeseen improvements in the manufacture of flexible disk recording media.

In heretofore, unrelated developments, some inventors have suggested that certain benefits may be derived from the use of FeO in magnetic coating compositions. For example, in U.S. Pat. No. 4,276,183 to Wilson, the use of 1-4 weight percent FeO is disclosed as being related to the achievement of superior orientation ratios, squareness, and the improvement of chemical stability in a wide variety of recording materials. Although it is mentioned that his coating formulations can be used in disks, it does not appear that he actually used them in disks or discovered any particular advantages of the use of FeO in disks.

German Offenlegeningschrift No. 1,907,236, cited in U.S. Pat. No. 3,897,354 to Woditsch, discloses the desirability of using some FeO to ensure uniform quality and constant resonance loss in the magnetic tape. However, it is also stated that it is difficult to repeatedly obtain the FeO content necessary for such properties.

Another publication which relates to the art discussed below includes U.S. Pat. No. 4,430,782 which describes the technology of burnishing flexible disks.

The above-identified references are necessarily discussed with a hindsight review of the invention. The prior art disclosed was turned up only in a post-invention review of the art and it is not intended to suggest that these references would have been consulted by one of ordinary skill faced with the problems to which the inventor has directed his efforts.

SUMMARY OF THE INVENTION

It is a principle object of this invention to produce an improved flexible (floppy) disk for the storage of magnetic data, a disk having an improved combination of opacity and improved magnetic recording characteristics for any appropriate magnetic coating composition of the type comprising magnetic particles dispersed in an organic resin binder system.

Another object of this invention is to provide an improved flexible disk which may be manufactured using thinner magnetic coatings and still demonstrate adequate infrared opacity and have improved surface characteristics.

An important objective of this invention is to disclose processes for achieving a flexible disk with improved magnetic recording performance characteristics, and, more particularly, improved dependability in terms of fewer recording imperfections, i.e. fewer signal dropouts, once the disk is in service.

Another object of the invention is to provide an improved two-sided flexible disk.

Other objects of this invention will be obvious to those skilled in the art upon reading this disclosure.

The above objectives have been achieved, in part, by incorporating substantial quantities of FeO, usually as magnetite, into the magnetic recording coating. The FeO-bearing magnetic particles replace some of the gamma ferric oxide or carbon black as used in magnetic media. The FeO also may be incorporated into an oxide powder as is the case with cobalt-doped, or cobalt-adsorbed, iron oxide magnetic particles.

In this case, these particles can replace some or all of the chromium dioxide used in high density recording media. As is already known in the magnetic recording art, small quantities of magnetite will comprise sufficient FeO to give a measurable improvement in the signal output properties of magnetic recording media. However, in flexible-recording media of the flexible disk type, it has been discovered that FeO has a number of additional characteristics when it is incorporated into the magnetic media at appropriate levels. These advantages include the following:

1. The electrical conductivity of the flexible disk will be increased markedly, e.g. to a range of from about 0.4 to 1.0 micromhos (as measured in 100-microinch thick coating samples) and more importantly, that the conductivity level—even though it is above levels previously thought to be entirely satisfactory—contributes significantly to the improved performance of the flexible disk product. One advantage is avoiding transient drop outs, when used in typical computer environments. In such products, it has been found advisable not to remove all of the carbon black as had been contemplated, but to use a combination of carbon black, magnetite, or other conductive particles to achieve conductivity levels which exceed the conductivity levels previously to be entirely suitable for optimum operation of flexible magnetic recording disks. Such very high-conductivity compositions have the additional benefit of maintaining very adequate conductivities, often above 0.4 or so, even when the coating thickness is markedly reduced, i.e., to the 40-60 microinch range. (Coating thicknesses herein are those of the dried coatings unless otherwise specified).

2. The infrared transmission can be reduced to such low levels that coating thickness as low as 40 to 60 microinches can be achieved with acceptable infrared opacity and excellent conductivity. As will be evident to those skilled in the art, the thinner coatings have further improved magnetic recording response, particularly at shorter wavelengths, since as the coating thickness is reduced, so are the demagnetizing fields reduced for short wavelength recording.

3. The flexible disk magnetic recording media comprising FeO according to the invention have improved burnishability characteristics. This results in a surface of superior quality, usually detectable by greater gloss, but also detectable by less noise and more sensitivity in recording short wavelength signals. It may also be that the improved conductivity characteristics of the tape are related to the improved burnishability contributed by the magnetite/FeO-bearing particles.

Advantageous products of the invention are flexible disks which have relatively thin magnetic recording coatings on each side of the product. Each of these coatings will be about 100 microinches or less in thickness. Indeed, it is a particular advantage of the invention that flexible disks can be prepared with magnetic coating thickness within the range of 75 to 85 microinches in thickness, and even thinner within the range of 40 to 60 microinches for high coercivity coatings using cobalt-adsorbed gamma iron oxide. Such thinner coatings rely, to an even greater extent, on the exceptional opacity, and conductivity and burnishability of the FeO-containing particulate formulations.

The improved physical properties are believed to be partly assignable to those FeO-bearing magnetite particles which are somewhat larger and/or are somewhat more equant (less acicular) than the magnetically equivalent gamma ferric oxide particles. For equivalent magnetic performance in terms of coercive force, magnetic moment, and the like, a more burnishable formulation is made possible by using magnetite particles having less surface area and lower binder demand.

It has been found advantageous to incorporate from about 2.5% to about 25% of FeO (most advantageously about 4% to 20%), by weight of magnetic pigment, in the magnetic coating media such as those widely known in the art. The invention is of particular value with flexible disks having magnetic recording surfaces on each side because it is with such disks burnishing qualities can be best balanced against desired opacity.

As a result of some or all of the recognized advantages, and perhaps some unrecognized phenomena as well, the flexible disks of the invention exhibit substantially improved magnetic signal quality, typically from 5–12%, and also a very significant reduction is recording imperfections, e.g. instances of drop-outs, i.e. magnetic recording sites on the disk unable to function properly in a read/write function.

The manufacturing processes employed when using magnetite or FeO-containing gamma ferric oxide in the magnetic coating do not differ significantly from those widely used in the industry to make flexible disks from gamma ferric oxide. The principal differences will be related to the ability to use thinner coatings and achieve a better burnishing with less damage to the coating and/or less critical control of the burnishing step. Coatings are usually in the range of 40 to 90 microinches, but the particular advantage of the invention is that excellent coatings of below about 90 microinches are achieved.

Generally, the advantages of this invention are realized with a total ferrous (FeO) content of at least approximately 2.5%, by weight of the magnetic oxide loading with a magnetic oxide loading in the formulation of about 55%–75% by weight of the solids in the coating, excluding solvent. Some advantages associated with the use of FeO will increase as the FeO content of the oxide is increased. As the FeO content is increased, the oxide and oxide blend will exhibit more opacity, and better magnetic properties, higher residual induction ($B_r$) and maximum intrinsic induction ($B_m$) and/or coercive force (Hc).

It is advantageous to keep some carbon black in the coating formulation. To the extent it is removed in favor of FeO-bearing magnetite, it is one factor that allows more magnetic pigment to be added to a given composition. To the extent carbon black is maintained in the formulation, it may be selected either for maximizing its opacity-contributing characteristics or for its conductivity characteristics.

In most formulations conductivity is optimized at levels of from 4 to 20% of carbon based on total magnetic powder content. Formulations of about 16–20% are characterized by extraordinary durability and product life.

Infrared opacity is usually defined in the flexible disk art as 99% opacity (1% transmission) to light of 940 nanometers wavelength. However, the opacity is not linear with respect to coating thickness. Thus it is very desirable to achieve opacities that result in very low infrared transmission at, say, a dual-coating of 100 microinch test thickness. Transmissions of less than about 0.1% are advantageous at this test thickness.

In general, for a given coating, each increment of a coating thickness will absorb the same percentage of incident light, e.g. infrared. Thus increasing the thickness by a factor by two, where one thickness absorbed 50%, will decrease the transmission to 25%. However, it will take a redoubling of the thickness to reduce the transmission once more a factor 2, i.e. to 12.5% etc. Thus each coating will exhibit a relationship between transmission and thickness which will approximate the relationship:

$$I_2 = (I_1)^a$$

where:
$a = T_2/T_1$ and:
$T_1$ is measured thickness
$T_2$ is a second thickness
$I_1$ is transmission of $T_1$
$I_2$ is transmission $aT_2$

ILLUSTRATIVE EXAMPLES OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purpose of illustration in order that others skilled in the art will more fully understand the invention and the principles thereof and will be able to modify it and embody it in a variety of forms, each as may be best suited to the condition of a particular case.

IN GENERAL

In the following experimental work, some magnetic oxides, all commercially-available materials, have the following nominal average particle sizes. They are presented herein only to show the relative differences in shape and size between some of the oxides described in some working examples:

TABLE A

| Oxide | Length (microns) | Width (microns) | B.E.T. Surface Area ($m^2/g$) |
|-------|------------------|-----------------|-------------------------------|
| A | 0.6 | 0.08 | 17 |
| B | 0.7 | 0.1 | 16 |
| C | 0.45 | 0.09 | 14 |
| D | 0.8 | 0.1 | 16 |

Other properties of these oxides:

TABLE B

| Oxide | Type | % FeO in Oxide | Hc(Oe) | Br(G) | Bm(G) |
|-------|------|----------------|--------|-------|-------|
| A | gamma-$F_2O_3$ | 0.6 | 296 | 1911 | 3537 |
| B | gamma-$F_2O_3$ | 0.7 | 303 | 2002 | 3661 |
| C | magnetite | 22 | 325 | 2066 | 3797 |
| D | magnetite | 19 | 375 | 2081 | 3661 |

Surface area is measured by the BET nitrogen absorption method well known in the art; results are given in $m^2$/gram. The magnetic properties are measured on a BH meter in a one kilooersted field. Hc is coercive force and the units are oersteds. Br is residual induction and the units are in gauss. Bm is maximum induction in the hysteresis loop; the units are also in gauss.

The following formula is used in the working examples, unless the example specifically indicates a modification thereof.

Examples % by weight solids

| Prepolymerized polyester polyurethane* | 14 |
|---|---|
| Phenoxy resin** | 6 |
| Isocyanate crosslinker*** | 3 |
| Magnetic pigment | 63 |
| Carbon Black, e.g. XC-72R from Cabot Corp. | 7 |
| Miscellaneous additives including: | |
| Head cleaning abrasive agent, alumina | 1 |
| Wetting agent for oxide | 2 |
| Lubricant | 3 |
| Catalyst, Fungicide etc. | 1 |

*Estane 5701 from Goodrich Chemical
**PKHH from Union Carbide Corp.
***Mondur CB-701 from Mobay Chemical Co.

All of these ingredients are well known in the magnetic recording are; generally equivalent materials may be selected from a number of supplies by those skilled in the art. The formulations also are mixed according to procedures generally known to those skilled in the art and utilizing tetrahydrofuran solvent as a liquid vehicle. The PTB reference standard referred to herein is a disk supplied by Physikalesch-Technische Bundaesanstalt, Federal Republic of Germany, and described in reference material supplied by that organization, i.e. PTB-AK-21 by H. J. Schroeder and A. Thiel and entitled "Reference Material RM6596 for 130 mm Flexible Disk Cartridges", (ISSN 0340-8639) Braunschweig, November 1980.

1F signal is signal amplitude measured as a percent of the PTB Reference Standard at 125,000 flux transitions per inch. 2F signal is signal amplitude measured as a percent of the PTB Reference Standard at 250,000 flux transitions per inch.

Conductivity, as described herein, is measured using a strip of coated material 5.5 inches long and 0.5 inches wide with a coating thickness of about 100 microinches.

Infrared transmission, as described herein, is measured through a disk coated on each side with a coating material of about 100 microinch thickness. Transmission of a wavelength of 940 nanometers is the measurement standard. A transmission of less than 1% for the disk as a whole is required. The 100-microinch test coatings are found to be convenient for predicting the excellent conductivity and opacity of the thinner coatings.

The following are specific examples of flexible disk materials made and evaluated according to the foregoing general formula and procedure. A 5.25-inch flexible magnetic disk comprising about 100 microinch-thick coating was used.

EXAMPLES 1–5

Table C illustrates some of the primary properties measured on 100-microinch, dual-coated, test disks:

TABLE C

| Example No. | 1 | 2 | 3 | 4 | 5 |
|---|---|---|---|---|---|
| Oxide used | 75A/25C | 50A/50C | 25A/75C | 100C | 75B/25D |
| Weight % FeO | 6 | 11 | 16 | 22 | 5 |
| Magnetic Properties* | | | | | |
| Hc, (Oe) | 305 | 307 | 304 | 305 | 315 |
| Br, (G) | 600 | 658 | 717 | 728 | 724 |
| Bm, (G) | 972 | 1079 | 1181 | 1341 | 1189 |
| Recording Performance | | | | | |
| 1F Signal, Track 00 | 93 | 96 | 98 | 101 | 93 |
| 2F Signal, Track 39 | 87 | 92 | 91 | 95 | 104 |
| Conductivity, (micromho) | 0.82 | 0.95 | 0.4 | 0.34 | 0.99 |
| Infrared Transmission, (%) | 0.4 | 0.06 | 0.01 | 0.00 | 0.3 |

*B-H properties in 1.0 kOe field.

EXAMPLES 6–7

Examples 1 and 5 are repeated except that the Type A or B oxide is replaced with cobalt-modified iron oxide and/or chromium dioxide, respectively. In each case, excellent opacity and conductivity are achieved with disks comprising dual 80-microinch magnetic coatings.

EXAMPLES 8, 9, and 10

Examples 3, 4 and 5 are repeated except that the carbon black is reduced to about 2.5% in each case and replaced with an equivalent weight of the oxide or oxide blend. Excellent opacity and good conductivity is achieved with disks comprising dual 80-microinch magnetic coatings.

EXAMPLES 11 and 12

Example 3 and 4 are repeated while reducing the coating thickness to about 50 microinches. Disks of good opacity and recording characteristics are obtained.

EXAMPLE 13

Example 1 is repeated except that the magnetic oxide pigment blend is replaced with a cobalt-modified iron oxide containing about 10% of FeO. One such magnetic material is that sold under the trade designation MO-2670 by Pfizer and utilized in VHS video tapes of relatively high coating thicknesses. A coating, 50 microinches in thickness, is coated on each side of a magnetic disk which, thereupon, will exhibit excellent opacity, excellent magnetic performance with good conductivity. The conductivity is believed to contribute markedly to the performance of said disks, probably by better anti-static properties.

It is also to be understood that the following claims are intended to cover all of the generic and specific features of the invention herein described and all statements of the scope of the invention which might be said to fall therebetween.

What is claimed is:

1. In an opague, apertured, flexible magnetic recording disk of the type comprising a coating of magnetic oxide particles, in an organic binder, on each side of said disk, the improvment wherein said magnetic pigment consist of from 10 to 14% FeO and each coating has a maximum thickness of about 90 microinches and wherein said magnetic coating, when tested at a coating thickness of 100 microinches, has a conductivity of at least about 0.4 micromhos.

2. A magnetic recording disk as defined in claim 1 wherein the magnetic coating, when tested at a coating thickness of about 100 microinches will have a maximum infrared transmission of about 0.4 percent.

3. A magnetic recording disk as defined in claim 2 wherein said infrared transmission is less than 0.1 percent.

4. A coated web stock useful in making magnetic recording disks of the floppy disk type comprising a flexible substrate and having coating on each side thereof a magnetic coating having a maximum thickness of 90 microinches, said coating containing a quantity of FeO of from 10 to 14% by weight of the magnetic particles used in said magnetic coating, which in combination with other electroconductive materials in said coating, is effective to achieve an infrared transmission of less than 0.1 and will have a conductivity of at least 0.4 micromhos.

5. A process for making an improved, burnished infrared opaque magnetic recording medium of the flexible disk type comprising the steps of
   (1) coating a magnetic composition on said disk, at a thickness of from 40 to 90 microinches, the magnetic composition comprising a quantity of magnetite of from 10 to 14% by weight of magnetic particles in said coating sufficient to reduce the opacity of said disk to less than 1% and to achieve a conductivity of said disk of at least about 0.4 micromhos; and
   (2) burnishing said disk.

* * * * *